Patented Sept. 25, 1934

1,974,805

UNITED STATES PATENT OFFICE 1,974,805

TREATMENT OF HYDROCARBON OILS

Louis A. Clarke, Fishkill, N. Y., assignor to The Texas Company, New York, N. Y., a corporation of Delaware No Drawing. Application July 20, 1932, Serial No. 623,604

2 Claims. (Cl. 196—13)

This invention relates to refining hydrocarbon oils by treatment with a solvent liquid, and more particularly to the treatment of hydrocarbon oils with a solvent material derived from petroleum distillates.

My invention contemplates the treatment of hydrocarbon oils, such as mineral lubricating oil, kerosene, or naphtha fractions, to remove undesired constituents therefrom with a solvent composed of cresylic and other solvent bodies derived from the chemical treatment of petroleum distillates, particularly cracked petroleum naphtha and the like.

Certain petroleum distillates, particularly naphtha distillate, obtained in the cracking of petroleum for the production of motor fuel, contain complex hydroxy aromatic compounds, compounds of the cresylic type, probably including alkyl-substituted phenols, such as cresols, thiocresols, xylenols and the like. I have found that this material is particularly well adapted as a solvent for refining lubricating oil fractions to remove undesired constituents therefrom, such as low viscosity index constituents, unsaturated bodies, sulphur-bearing compounds, etc.

Relatively pure or anhydrous phenol has been previously proposed in the prior art for treating hydrocarbon oils. Phenol becomes solid at temperatures of around 100° F. or below, and consequently when used as a solvent for mineral oil, it is necessary to carry out the treatment at temperatures above its melting point.

The solvent material of my invention, however, is in the form of a liquid at ordinary temperatures. It consists of a complex mixture of aromatic hydroxy compounds, having a phenolic reaction and capable of extraction with aqueous alkalies. Its adaptability as an extractant for lubricating oil fractions may be due in part to its high molecular weight, relatively greater, for example, than that of ordinary phenol. It may also be due to side chains or certain similarities in molecular structure as well as in the elements entering into the structure as compared with those of the hydrocarbons extracted by this material from the lubricating oil fractions which are being treated. It is, of course, generally true that the most effective solvent media are those possessing molecular similarity to the material which is to be dissolved or acted upon by the solvent.

This solvent material is advantageously prepared by washing cracked naphtha distillate, such as produced in a liquid or vapor phase cracking operation, with an alkaline solution which reacts with these cresylic bodies to form salts which are soluble in the aqueous alkali and which, therefore, may be readily extracted from the oil.

Caustic solution may be used to advantage for washing the naphtha distillate. The resulting alkaline solution may then be neutralized or acidified with $CO_2$, flue gas or sulphuric acid to effect separation of the cresylic bodies. This separated material may then, if desired, be subjected to distillation in order to remove water as well as to obtain a distillate fraction which is free from heavy, tarry or gummy bodies.

As an example of the treatment of a lubricating oil fraction with this material, a lubricating oil obtained from Mid-Continent crude and having the following characteristics may be used:

| | |
|---|---|
| Gravity °A. P. I. | 23.7 |
| Percent sulphur | 0.46 |
| Percent carbon residue | 0.96 |

*Saybolt universal viscosity*

| | |
|---|---|
| At 100° F | 364 |
| At 210° F | 76 |
| Viscosity index | 63 |

This oil is then mixed in equal proportions with a solvent liquid of the foregoing nature, either alone or in mixture with a small percentage of water, for example, about 8%, and agitated for several minutes at a temperature from 0° to 70° C., and preferably at about room temperature. The mixture is then allowed to stand until separation into two layers occurs, the lower layer containing the dissolved material being drawn off. The upper layer is then washed with aqueous caustic solution and with water until neutral, in order to remove the remaining solvent liquid, or the solvent may be removed by vacuum or steam distillation, or a combination of steam and vacuum. The resulting oil, after removal of the solvent liquid, tests as follows:

| | |
|---|---|
| Gravity °A. P. I. | 25.4 |
| Percent sulphur | 0.26 |
| Percent carbon residue | 0.53 |

*Saybolt universal viscosity*

| | |
|---|---|
| At 100° F | 299 |
| At 210° F | 72 |
| Viscosity index | 87 |

The viscosity index of the foregoing oils has been determined by reference to the alignment chart, published on page 843 of the July 1931 issue of Industrial and Engineering Chemistry.

As will be observed from the foregoing tests, the oil resulting from treatment with this solvent liquid has an increased gravity as well as a much higher viscosity index and is, therefore, rendered more adaptable for use as a lubricant for internal combustion engines and the like.

The solvent material may be recovered from the extract by distillation or by other means cited above for further use in treating fresh oil. While a mixture of this solvent material containing a small amount of water has been described in the foregoing example, it is contemplated that it may be used without the addition of water, or the amount of water may be varied, depending upon the extent to which it is desired to modify the degree of selectivity.

The invention is not limited to the treatment of lubricating oil fractions since this solvent material may also be used in the solvent refining of various hydrocarbons, including kerosene and gasoline fractions.

Obviously many modifications and variations of the invention, as hereinbefore set forth, may be made without departing from the spirit and scope thereof, and therefore only such limitations should be imposed as are indicated in the appended claims.

I claim:
1. The process of refining and purifying mineral oil to remove undesired constituents including aromatic and naphthenic constituents and sulphur-bearing bodies which comprises extracting these undesired constituents from the oil with a solvent liquid obtained by neutralizing or acidifying the extract derived from caustic washing unrefined cracked petroleum distillate and which is composed of a mixture of aromatic hydroxy hydrocarbon compounds comprising predominantly the higher homologs of phenol and cresol and the derivatives of such homologs.

2. The process of refining and purifying mineral lubricating oil to remove undesired low viscosity index constituents which comprises extracting the undesired constituents from the oil with a solvent composed of a mixture of up to about eight percent water and the remainder a liquid mixture of aromatic hydroxy hydrocarbons derived from the alkaline treatment of unrefined cracked petroleum distillate and which comprises predominantly the higher homologs of phenol and cresol and the derivatives of such homologs.

LOUIS A. CLARKE.